United States Patent
Lee et al.

(10) Patent No.: US 10,349,063 B2
(45) Date of Patent: Jul. 9, 2019

(54) METHOD AND APPARATUS FOR CODING VIDEO SUPPORTING PLURALITY OF LAYERS

(71) Applicant: KT CORPORATION, Gyeonggi-do (KR)

(72) Inventors: Bae Keun Lee, Seoul (KR); Joo Young Kim, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 558 days.

(21) Appl. No.: 14/890,255

(22) PCT Filed: May 22, 2014

(86) PCT No.: PCT/KR2014/004566
§ 371 (c)(1),
(2) Date: Nov. 10, 2015

(87) PCT Pub. No.: WO2014/189300
PCT Pub. Date: Nov. 27, 2014

(65) Prior Publication Data
US 2016/0088303 A1    Mar. 24, 2016

(30) Foreign Application Priority Data

May 24, 2013  (KR) .................. 10-2013-0059332
May 21, 2014  (KR) .................. 10-2014-0061080

(51) Int. Cl.
*H04B 1/66* (2006.01)
*H04N 19/186* (2014.01)
(Continued)

(52) U.S. Cl.
CPC ......... *H04N 19/186* (2014.11); *H04N 19/187* (2014.11); *H04N 19/33* (2014.11);
(Continued)

(58) Field of Classification Search
CPC .... H04N 19/70; H04N 19/593; H04N 19/186; H04N 19/187; H04N 19/80; H04N 19/33; H04N 19/59
(Continued)

(56) References Cited

U.S. PATENT DOCUMENTS 6,559,860 B1    5/2003  Hamilton et al.
2004/0004629 A1  1/2004  Hamilton et al.
(Continued)

FOREIGN PATENT DOCUMENTS

CN    101176346 A    5/2008
CN    101686395 A    3/2010
(Continued)

*Primary Examiner* — Sathyanaraya V Perungavoor
*Assistant Examiner* — Peet Dhillon
(74) *Attorney, Agent, or Firm* — IP Legal Services, LLC

(57) ABSTRACT

Disclosed are a method and an apparatus for coding a video supporting a plurality of layers. The method for coding the video supporting the plurality of layers, according to the present invention, comprises the steps of: inducing a reference layer sample location from a reference layer picture used for inter-layer prediction of a current layer picture; resampling the reference layer picture, based on the reference layer sample location; and generating a prediction sample of a current block by inter-layer predicting the current block of the current layer picture, based on the resampled reference layer picture.

16 Claims, 4 Drawing Sheets

(51) Int. Cl.
*H04N 19/59* (2014.01)
*H04N 19/70* (2014.01)
*H04N 19/187* (2014.01)
*H04N 19/593* (2014.01)
*H04N 19/80* (2014.01)
*H04N 19/33* (2014.01)

(52) U.S. Cl.
CPC ............ *H04N 19/59* (2014.11); *H04N 19/593* (2014.11); *H04N 19/70* (2014.11); *H04N 19/80* (2014.11)

(58) Field of Classification Search
USPC .......................................................... 375/240
See application file for complete search history.

(56) References Cited

U.S. PATENT DOCUMENTS

| | | |
|---|---|---|
| 2006/0210185 A1 | 9/2006 | Sun |
| 2006/0222067 A1 | 10/2006 | Park et al. |
| 2006/0222068 A1 | 10/2006 | Park et al. |
| 2006/0222069 A1 | 10/2006 | Park et al. |
| 2006/0222070 A1 | 10/2006 | Park et al. |
| 2006/0233249 A1 | 10/2006 | Park et al. |
| 2006/0233263 A1 | 10/2006 | Park et al. |
| 2007/0160153 A1 | 7/2007 | Sullivan |
| 2007/0189382 A1 | 8/2007 | Park et al. |
| 2007/0189385 A1 | 8/2007 | Park et al. |
| 2008/0007438 A1 | 1/2008 | Segall et al. |
| 2008/0008235 A1 | 1/2008 | Segall |
| 2008/0008247 A1 | 1/2008 | Segall |
| 2008/0008394 A1 | 1/2008 | Segall |
| 2008/0031345 A1 | 2/2008 | Segall |
| 2008/0031346 A1 | 2/2008 | Segall |
| 2008/0031347 A1 | 2/2008 | Segall |
| 2008/0219354 A1 | 9/2008 | Segall et al. |
| 2008/0267289 A1 | 10/2008 | Yu et al. |
| 2008/0291997 A1 | 11/2008 | Yoon et al. |
| 2009/0060034 A1 | 3/2009 | Park et al. |
| 2009/0180550 A1 | 7/2009 | Park et al. |
| 2009/0180551 A1 | 7/2009 | Park et al. |
| 2009/0185627 A1 | 7/2009 | Park et al. |
| 2009/0196354 A1 | 8/2009 | Park et al. |
| 2010/0272188 A1 | 10/2010 | Park et al. |
| 2011/0211122 A1 | 9/2011 | Sullivan |
| 2012/0213296 A1 | 8/2012 | Sun |
| 2013/0271651 A1 | 10/2013 | Sullivan |
| 2014/0247877 A1 | 9/2014 | Park et al. |
| 2014/0269912 A1 | 9/2014 | Sullivan |
| 2014/0362909 A1* | 12/2014 | Chen ..................... H04N 19/82 375/240.12 |
| 2015/0071356 A1* | 3/2015 | Kim ..................... H04N 19/513 375/240.16 |

FOREIGN PATENT DOCUMENTS

| | | |
|---|---|---|
| CN | 102075755 A | 5/2011 |
| EP | 2044773 A1 | 4/2009 |
| KR | 10-2009-0003321 A | 1/2009 |
| KR | 10-2009-0006215 A | 1/2009 |

* cited by examiner

METHOD AND APPARATUS FOR CODING VIDEO SUPPORTING PLURALITY OF LAYERS

CROSS REFERENCE TO RELATED APPLICATIONS

This application is a National Stage Patent Application of PCT International Patent Application No. PCT/KR2014/004566 (filed on May 22, 2014) under 35 U.S.C. § 371, which claims priority to Korean Patent Application Nos. 10-2013-0059332 (filed on May 24, 2013) and 10-2014-0061080 (filed on May 21, 2014), the teachings of which are incorporated herein in their entireties by reference.

TECHNICAL FIELD

The present invention generally relates to a video compression technique and, more particularly, to a method and apparatus for video coding supporting multiple layers.

BACKGROUND ART

Recently, demand for high-resolution, high-quality video such as HD (High Definition) video and UHD (Ultra High Definition) video is increasing in various application fields. As video data has high-resolution, high-quality images, the amount of data is higher than for existing video data. Therefore, when the video data is transmitted using media such as existing wired and wireless broadband lines or is stored in existing storage media, transmission costs and storage costs increase. To solve these problems, caused by the high-resolution, high-quality video data, high-efficiency video compression techniques may be used.

As video compression techniques, there are various techniques such as an inter prediction technique for predicting the number of pixels included in a current picture from the picture preceding or following the current picture, an intra prediction technique for predicting the number of pixels in the current picture using information about the pixels included in the current picture, an entropy coding technique, in which the shortest code is assigned to the most frequently used value and the longest code is assigned to the least frequently used value, and the like. Video data may be effectively compressed using these video compression techniques, and may then be transmitted or stored.

DISCLOSURE

Technical Problem

The present invention provides a method and an apparatus for encoding and decoding an enhancement layer by performing inter-layer prediction in scalable video coding.

The present invention provides a resampling method and apparatus for compensating for the phase difference in scalable video coding.

Technical Solution

According to an embodiment of the present invention, a video decoding method supporting multiple layers is provided. The video decoding method includes deriving a reference layer sample location from a reference layer picture used for inter-layer prediction of a current layer picture, resampling the reference layer picture based on the reference layer sample location, and generating a prediction sample of a current block by performing inter-layer prediction on the current block of the current layer picture based on the resampled reference layer picture.

Deriving the reference layer sample location may be configured to derive the reference layer sample location corresponding to a top-left sample location of the current block based on information about a phase offset for compensating for a phase difference between layers.

The information about the phase offset may include at least one of a phase offset for a luma component and a phase offset for a chroma component.

According to another embodiment of the present invention, a video decoding device supporting multiple layers is provided. The video decoding device includes a prediction unit for deriving a reference layer sample location from a reference layer picture used for inter-layer prediction of a current layer picture, for resampling the reference layer picture based on the reference layer sample location, and for generating a prediction sample of a current block by performing inter-layer prediction on the current block of the current layer picture based on the resampled reference layer picture.

The prediction unit may derive the reference layer sample location corresponding to a top-left sample location of the current block based on information about a phase offset for compensating for a phase difference between layers.

The information about the phase offset may include at least one of a phase offset for a luma component and a phase offset for a chroma component.

Advantageous Effects

When inter-layer prediction is performed using a resampling method according to an embodiment of the present invention, the phase difference caused during the resampling process may be reduced by inducing a phase shift. Therefore, error attributable to the phase difference caused in the resampling process may be reduced. Also, according to an embodiment of the present invention, because the error attributable to the phase difference caused in the resampling process is reduced, prediction accuracy may be improved and encoding and decoding efficiency may also be improved.

BEST MODE

Figure 1:
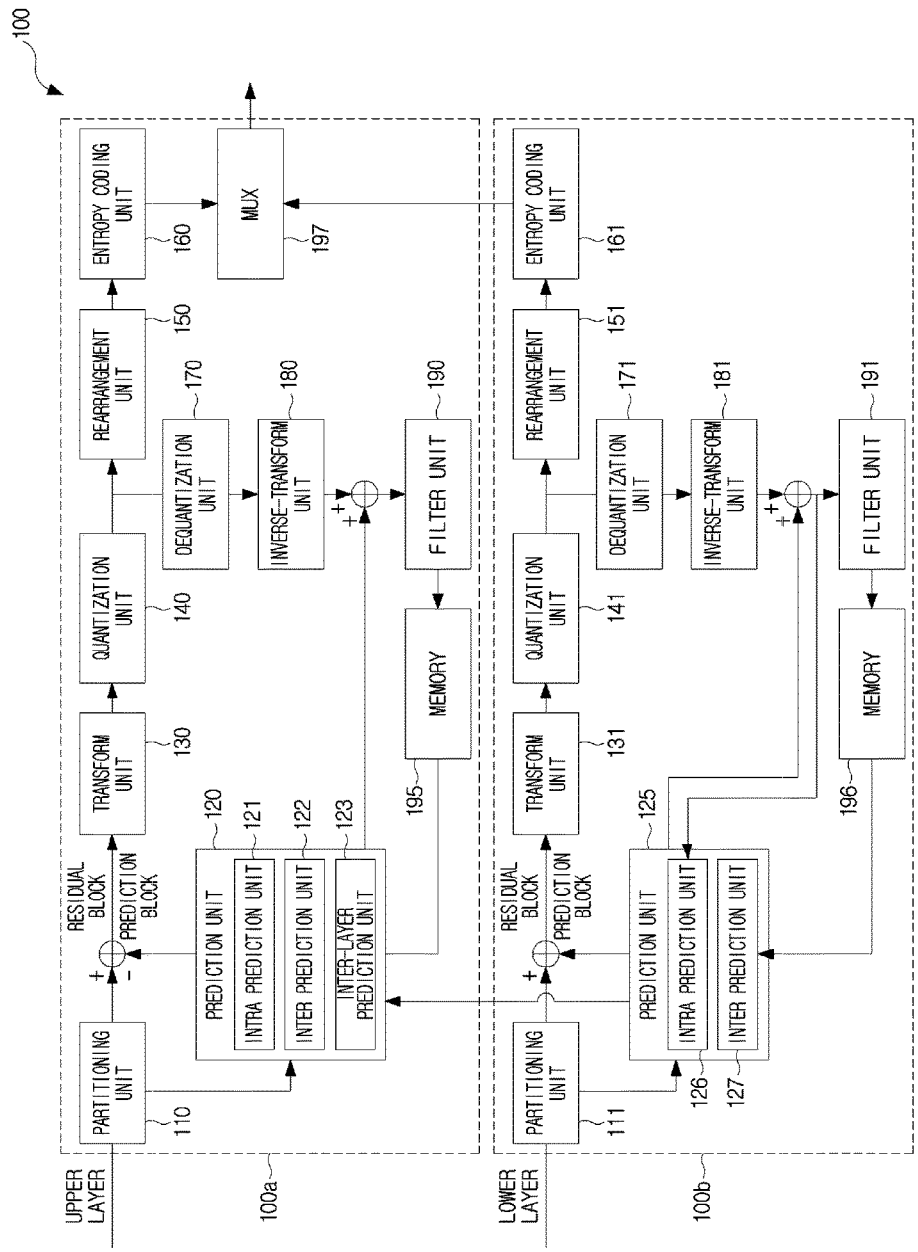
FIG. 1 is a block diagram schematically illustrating an encoding device according to an embodiment of the present invention.

Hereinafter, embodiments of the present invention are described in detail with reference to the accompanying drawings. In describing the embodiments of the present invention, a detailed description of related known elements or functions will be omitted if it is deemed to make the gist of the present invention unnecessarily vague.

In this specification, when it is said that one element is 'connected' or 'coupled' with another element, it may mean that the one element may be directly connected or coupled with the other element and a third element may be 'connected' or 'coupled' between the two elements. Furthermore, in this specification, when it is said that a specific element is 'included', it may mean that elements other than the specific element are not excluded and that additional elements may be included in the embodiments of the present invention or the scope of the technical spirit of the present invention.

Terms such as 'the first' and 'the second' may be used to describe various elements, but the elements are not restricted by the terms. The terms are used only to distinguish one element from the other element. For example, a first element may be named a second element without departing from the scope of the present invention. Likewise, a second element may be named a first element.

Furthermore, element modules described in the embodiments of the present invention are independently shown in order to indicate different and characteristic functions, but this does not mean that each of the element modules is formed of a separate piece of hardware or software. That is, the element modules are arranged and included for convenience of description, and at least two of the element modules may form one element module or one element module may be divided into a plurality of element modules to perform their own functions. An embodiment in which the element modules are integrated and an embodiment in which the element modules are separated are included in the scope of the present invention, unless it departs from the essence of the present invention.

Furthermore, in the present invention, some elements are not essential elements for performing essential functions, but may be optional elements for improving only performance. The present invention may be implemented using only essential elements for implementing the essence of the present invention other than elements used merely to improve performance, and a structure including only essential elements, but not optional elements used only to improve performance, is included in the scope of the present invention.

Video encoding and decoding that supports a multi-layer bitstream is called scalable coding. Because there is a strong correlation between the multiple layers, when prediction is performed using this correlation, duplicate elements may be removed and video encoding performance may be improved. Predicting the current layer, which is the target of prediction, using information about another layer is referred to as inter-layer prediction.

At least one of a resolution, a frame rate, and a color format may be different between the multiple layers, and resampling of a layer, such as up-sampling or down-sampling, may be performed in order to adjust the resolution during the inter-layer prediction.

FIG. 1 is a block diagram schematically illustrating an encoding device according to an embodiment of the present invention.

An encoding device 100 according to the present invention includes an encoding unit 100a for an upper layer and an encoding unit 100b for a lower layer.

The upper layer may be called a current layer or an enhancement layer, and the lower layer may be called a reference layer or a base layer. At least one of the resolution, frame rate, and color format may differ between the upper layer and the lower layer. When a change of resolution is required for inter-layer prediction, up-sampling or down-sampling of the layer may be performed.

The encoding unit 100a of the upper layer may include a partitioning unit 110, a prediction unit 100, an intra prediction unit 121, an inter prediction unit 122, an inter-layer prediction unit 123, a transform unit 130, a quantization unit 140, a rearrangement unit 150, an entropy coding unit 160, a dequantization unit 170, an inverse-transform unit 180, a filter unit 190, memory 195, and a MUX 197.

The encoding unit 100b of the lower layer may include a partitioning unit 111, a prediction unit 125, an intra prediction unit 126, an inter prediction unit 127, a transform unit 131, a quantization unit 141, a rearrangement unit 151, an entropy coding unit 161, a dequantization unit 171, an inverse-transform unit 181, a filter unit 191, and memory 196.

The encoding unit may be implemented by a video encoding method described in an embodiment of the present invention, which will be described below, but the operations of some parts may not be performed in order to reduce the complexity of the encoding device or to enable fast real-time encoding. For example, rather than a method in which all intra prediction mode methods are used to select the optimal intra-encoding method, a method in which one is selected from among a limited number of intra prediction modes and the selected one is set as the final intra prediction mode may be performed for real-time encoding when the prediction unit performs intra prediction. In another example, a prediction block used for intra prediction or inter prediction may have a limited form.

The unit of a block processed in the encoding device may be a coding unit for performing coding, a prediction unit for performing prediction, and a transform unit for performing transformation. The coding unit, the prediction unit, and the transform unit may be represented as CU, PU, and TU, respectively.

The partitioning units 110 and 111 may partition a layer by partitioning a layer picture into multiple combinations of coding blocks, prediction blocks, and transform blocks, and by selecting one combination of coding blocks, prediction blocks, and transform blocks based on a predetermined reference (for example, a cost function). For example, in order to partition a layer picture into coding units, a recursive tree structure such as a QuadTree structure may be used. Hereinafter, in an embodiment of the present invention, a coding block may mean not only a block for encoding but also a block for decoding.

A prediction block may be a unit for performing prediction, such as intra prediction or inter prediction. A block for intra prediction may be a block having the form of a square, such as 2N×2N or N×N. As a block for inter prediction, there are a block in the form of a square, such as 2N×2N and N×N, a block in the form of 2N×N and N×2N, obtained by dividing a prediction block having a square form into two, and a block having an asymmetric form, obtained by a prediction block partitioning method using Asymmetric Motion Partitioning (AMP). The transform unit 115 may use different transform methods according to the form of the prediction block.

The prediction units 120 and 125 of the encoding units 100a and 100b may include intra prediction units 121 and 126 for performing intra prediction and inter prediction units 122 and 126 for performing inter prediction. The prediction unit 120 of the encoding unit 100a for the upper layer further includes an inter-layer prediction unit 123 that performs prediction for the upper layer using the information about the lower layer.

The prediction units 120 and 125 may determine whether to perform intra prediction or inter prediction for a prediction block. The processing unit on which prediction is performed may be different from the unit of the processing block for determining the prediction method. For example, when intra prediction is performed, the prediction mode may be determined based on a prediction block, and the prediction process may be performed based on a transform block. A residual (residual block) between the generated prediction block and the original block may be input to the transform units 130 and 131. Also, the prediction mode information used for prediction, motion vector information, and the like are encoded along with the residual by the entropy coding unit 130, and may be transmitted to the decoding device.

When a Pulse Coded Modulation (PCM) mode is used, the original block may be encoded without performing prediction by the prediction units 120 and 125, and may be transmitted to a decoding unit.

The intra prediction units 121 and 126 may generate an intra-predicted block based on reference pixels located around the current block (the prediction target block). In the intra prediction method, the intra prediction mode may have a directional prediction mode, which uses reference pixel information according to the prediction direction, and a non-directional mode, which does not use direction information when making the prediction. The mode for predicting luma information may be different from the mode for predicting chroma information. Intra prediction mode information, obtained by predicting luma information, or information about the predicted luma signal may be used to predict chroma information. Meanwhile, if the reference pixels are not available, a prediction block may be generated by replacing the unavailable reference pixels with other pixels.

A prediction block may include multiple transform blocks. If the size of a prediction block is the same as the size of a transform block when performing intra prediction, intra prediction for the prediction block may be performed based on a left pixel, an upper-left pixel, and an upper pixel of the prediction block. However, if the size of a prediction block is different from that of a transform block when performing intra prediction and thus the prediction block includes multiple transform blocks, intra prediction may be performed based on reference pixels determined based on the transform block.

The intra prediction method may generate a prediction block after applying a Mode Dependent Intra Smoothing (MDIS) filter to reference pixels according to the intra prediction mode. The types of the MDIS filter applied to the reference pixels may be different. The MDIS filter is an additional filter applied to an intra-predicted block generated by performing intra prediction, and may be used for reducing a residual between reference pixels and the intra-predicted block, generated after performing prediction. When MDIS filtering is performed, different filtering may be performed on reference pixels and on some columns included in the intra-predicted block according to the direction of the intra prediction mode.

The inter prediction units 122 and 127 may perform prediction by referring to the information about a block included in at least one of the picture preceding and the picture following the current picture. The inter prediction units 122 and 127 may include a reference picture interpolation unit, a motion prediction unit, and a motion compensation unit.

The reference picture interpolation unit may be provided with information about a reference picture from the memory 195 or 196, and may generate information about a pixel, which is smaller than an integer pixel, from the reference picture. In the case of a luma pixel, an 8-tap DCT-based Interpolation Filter with a variable filter coefficient may be used to generate information on pixels smaller than an integer pixel in units of 1/4 pixel. In the case of a chroma signal, a 4-tap DCT-based Interpolation Filter with a variable filter coefficient may be used to generate information on pixels smaller than an integer pixel in units of 1/8 pixel.

The inter prediction units 122 and 127 may perform motion prediction based on the reference picture interpolated by the reference picture interpolation unit. In order to obtain a motion vector, various methods, such as a Full search-based Block Matching Algorithm (FBMA), a Three Step Search (TSS) algorithm, a New Three-Step Search (NTSS) algorithm, and the like, may be used. A motion vector may have a motion vector value in units of ½or ¼pixel based on the interpolated pixel. The inter prediction units 122 and 127 may perform prediction on the current block by applying one of various inter prediction methods.

As the inter prediction method, various methods, for example, a skip method, a merge method, a Motion Vector Prediction (MVP) method, etc. may be used.

Motion information in inter prediction, namely, information about the index of a reference picture, a motion vector, a residual signal, and the like, is entropy-coded and transmitted to the decoding unit. When a skip mode is applied, processes for generating, transforming, quantizing, and transmitting a residual may not be performed.

The inter-layer prediction unit 123 performs inter-layer prediction, in which the upper layer is predicted using information about a lower layer. The inter-layer prediction unit 123 may perform inter-layer texture prediction, inter-layer motion prediction (inter-layer inter prediction), inter-layer syntax prediction, and the like using the texture, intra prediction mode information, motion information, syntax information, etc. about the lower layer.

"Inter-layer texture prediction" means that the texture of the reference block in the lower layer is used as the prediction sample for the current block of the upper layer. In this case, the texture of the reference block may be scaled by upsampling.

As the inter-layer texture prediction, there may be intra BL prediction, in which the reconstructed value of the reference block in the lower layer is upsampled and the upsampled reference block is used as the prediction sample for the current block so as to encode a residual between the current block and the reference block, and reference index prediction, in which the upsampled lower layer is stored in memory and the stored lower layer is used as a reference index.

The intra prediction of the upper layer may be performed using the intra prediction mode information about the lower layer, in which case the intra prediction mode of the lower layer may be called a BL intra mode.

The inter-layer motion prediction is also referred to as inter-layer inter prediction. According to the inter-layer motion prediction, prediction for the current block of the upper layer may be performed using the motion information of the lower layer. The motion information may include a motion vector and a reference picture index.

Also, the inter-layer prediction unit 123 may perform inter-layer syntax prediction in which the texture of the current block is generated or predicted using the syntax information of the lower layer. In this case, the syntax information of the lower layer, used for prediction of the current block, may include information relating to the intra prediction mode, motion information, and the like.

According to inter-layer residual prediction, which is another example of inter-layer prediction, prediction for the current block may be performed using a residual picture, generated based on the difference between the restored picture of the upper layer and a picture obtained by resampling the restored picture of the lower layer.

Inter-layer texture prediction, inter-layer motion prediction, inter-layer syntax prediction, and inter-layer residual prediction are described as examples of inter-layer prediction, but inter-layer prediction that may be applied to the present invention is not limited to the above examples.

A residual block, which includes information about a residual, which is the difference between the prediction block generated by the prediction units 120 and 125 and a block reconstructed from the prediction block, is generated, and the residual block is input to the transform units 130 and 131.

The transform units 130 and 131 may transform the residual block using a transform method such as Discrete Cosine Transform (DCT) or Discrete Sine Transform (DST). Whether to apply DCT or DST to transform the residual block may be determined based on the intra prediction mode information about the prediction block, which was used for generating the residual block, and the information about the size of the prediction block. In other words, the transform units 130 and 131 may use different transform methods depending on the size of the prediction block and the prediction method.

The quantization units 140 and 141 may quantize the values that are transformed to a frequency domain by the transform units 130 and 131. The quantization coefficient may change according to the block or the importance of the picture. The values calculated by the quantization units 140 and 141 may be provided to the dequantization units 170 and 17 and the rearrangement units 150 and 151.

The rearrangement units 150 and 151 may rearrange the coefficient values for the quantized residual values. The rearrangement units 150 and 151 may change 2-dimensional block-type coefficients to one-dimensional vector form through a coefficient scanning method. For example, the rearrangement units 150 and 151 may scan from DC coefficients to coefficients of a high-frequency domain using a zigzag scanning method in order to change the 2-dimensional block-type coefficients to one-dimensional vector form. Depending on the size of the transform block and the intra prediction mode, a vertical scanning method, which scans 2-dimensional block-type coefficients in a vertical direction, and a horizontal scanning method, which scans 2-dimensional block-type coefficients in a horizontal direction, may be used. In other words, depending on the size of the transform block and the intra prediction mode, whether to use the zigzag scanning method, the vertical scanning method, or the horizontal scanning method may be determined.

The entropy coding units 160 and 161 may perform entropy coding based on the values calculated by the rearrangement units 150 and 151. Entropy coding may use various coding methods, for example, Exponential-Golomb coding, Context-Adaptive Variable Length Coding (CAVLC), and Context-Adaptive Binary Arithmetic Coding (CABAL).

The entropy coding units 160 and 161 may perform entropy coding based on a predetermined coding method by receiving various information, such as residual coefficient information and block type information of a coding block, prediction mode information, partition unit information, prediction block information and transmission unit information, motion vector information, reference frame information, interpolation information for a block, filtering information, and the like, from the rearrangement units 150 and 151 and the prediction units 120 and 125. Also, the entropy coding units 160 and 161 may entropy-code the coefficient value of a coding unit, input from the rearrangement units 150 and 151.

The entropy coding units 160 and 161 may encode the intra prediction mode information of the current block by binary-coding the intra prediction mode information. The entropy coding units 160 and 161 may include a codeword mapping unit for the binary coding, and may perform the binary coding differently depending on the size of the prediction block for intra prediction. The codeword mapping unit may adaptively generate a codeword mapping table through a binary coding operation, or may have a previously generated mapping table. In another embodiment, the entropy coding units 160 and 161 may represent the intra prediction mode information about the current block using a code-num mapping unit for performing code-num mapping and a codeword mapping unit for performing codeword mapping. The code-num mapping unit and the codeword mapping unit may generate a code-num mapping table and a codeword mapping table, respectively, or may respectively have a previously generated code-num mapping table and codeword mapping table.

The dequantization units 170 and 171 dequantize the values quantized by the quantization units 140 and 141, and the inverse-transform units 180 and 181 inverse-transform the values transformed by the transform units 130 and 131. The residual generated by the dequantization units 170 and 171 and the inverse-transform units 180 and 181 is combined with the prediction block, which was predicted by the motion prediction unit, the motion compensation unit, and the intra prediction unit included in the prediction units 120 and 125, whereby a reconstructed block may be generated.

The filter units 190 and 191 may include at least one of a deblocking filter, an offset correction unit, and an Adaptive Loop Filter (ALF).

The deblocking filter may remove block distortion, generated due to the boundaries between blocks, in the reconstructed picture. Whether to perform deblocking, namely, whether to apply the deblocking filter to the current block, may be determined based on the pixels included in some rows or columns of the block. When the deblocking filter is applied to a block, a strong filter or a weak filter may be applied according to the required strength of deblocking filtering. Also, in applying the deblocking filter, when vertical filtering and horizontal filtering are performed, the vertical filtering and the horizontal filtering may be processed concurrently.

The offset correction unit may correct an offset between the picture on which deblocking is performed and the original picture in pixel units. In order to perform the offset correction on a specific picture, a method in which the pixels included in the picture are divided into a certain number of areas, the area to which an offset is to be applied is determined, and the offset is applied to the area may be used, or a method in which the offset is applied in consideration of the information about the edge of each pixel may be used.

The Adaptive Loop Filter (ALF) may perform filtering based on the comparison of the picture, reconstructed after filtering, with the original picture. The pixels included in the picture are divided into one or more groups and a filter to be applied to each of the groups is determined, whereby different filtering may be performed on each of the groups.

The filter units 190 and 191 may apply only the deblocking filter, may apply only the deblocking filter and ALF, or may apply only the deblocking filter and the offset correction unit.

The memory 195 and 196 may store the reconstructed block or pictures calculated by the filter units 190 and 191, and the reconstructed block and pictures stored in the memory may be provided to the prediction units 120 and 125 when intra prediction is performed.

Information output from the entropy coding unit 100b of the lower layer and information output from the entropy coding unit 100a of the upper layer are multiplexed by the MUX 197, and may then be output in the form of a bitstream.

The MUX 197 may be included in the encoding unit 100b of the lower layer, or may be implemented as a separate device or module, unlike the encoding unit 100.

Figure 2:
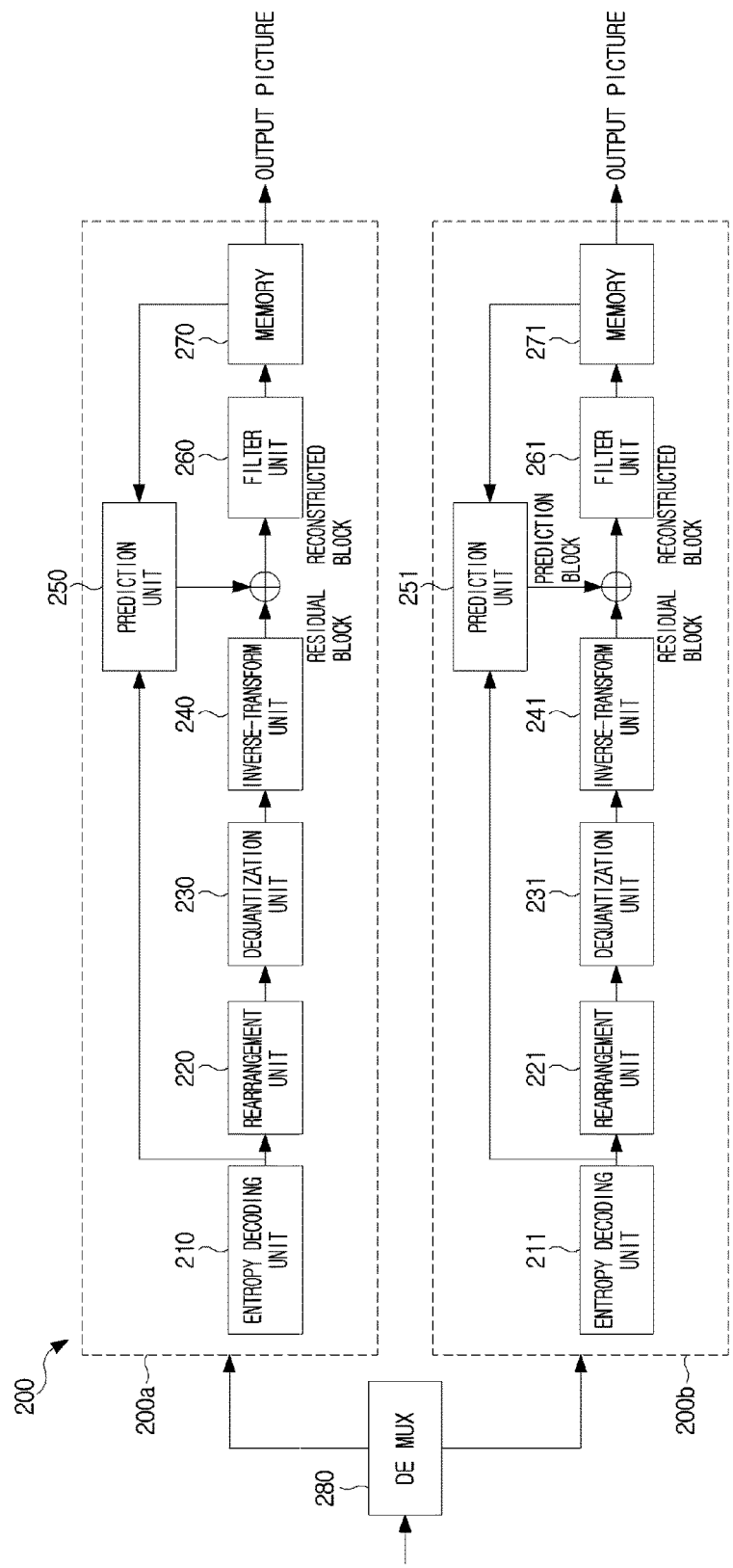
FIG. 2 is a block diagram schematically illustrating a decoding device according to an embodiment of the present invention.

FIG. 2 is a block diagram schematically illustrating a decoding device according to an embodiment of the present invention.

As illustrated in FIG. 2, a decoding device 200 includes a decoding unit 200a of an upper layer and a decoding unit 200b of a lower layer.

The decoding unit 200a of the upper layer may include an entropy decoding unit 210, a rearrangement unit 220, a dequantization unit 230, an inverse-transform unit 240, a prediction unit 250, a filter unit 260, and memory 270.

The decoding unit 200b of the lower layer may include an entropy decoding unit 211, a rearrangement unit 221, a dequantization unit 231, an inverse-transform unit 241, a prediction unit 251, a filter unit 261, and memory 271.

When a bitstream including multiple layers is transmitted from the encoding device, a DEMUX 280 demultiplexes the information according to each of the layers and transmits it to the decoding unit 200a or 200b of each of the layers. The input bitstream may be decoded through a process that is the inverse of the process of the encoding device.

The entropy decoding units 210 and 211 may perform entropy-decoding through the inverse of the entropy-coding process performed by the entropy coding unit of the encoding device. Among the pieces of information decoded by the entropy decoding units 210 and 211, information for generating a prediction block is provided to the prediction units 250 and 251, and a residual, entropy-decoded by the entropy decoding unit, may be input to the rearrangement units 220 and 221.

The entropy decoding units 210 and 211 may perform inverse transform by using at least one of CABAC and CAVLC, like the entropy coding units 160 and 161.

The entropy decoding units 210 and 211 may decode information about intra prediction and inter prediction performed by the encoding device. The entropy decoding unit includes a codeword mapping unit that has a codeword mapping table for generating an intra prediction mode number from a received codeword. The codeword mapping table may be stored in advance, or may be generated adaptively. When a code-num mapping table is used, a code-num mapping unit for performing code-num mapping may be additionally arranged.

The rearrangement units 220 and 221 may rearrange the bitstream, entropy-decoded by the entropy decoding units 210 and 211, based on the arrangement method used by the encoding unit. The coefficients, represented in one-dimensional vector form, may be rearranged as 2-dimensional block-type coefficients by being reconstructed. The rearrangement unit receives the information about the coefficient scanning method performed by the encoding unit, and may rearrange the coefficients using a method in which inverse scanning is performed based on the sequence of scanning performed by the encoding unit.

The dequantization units 230 and 231 may perform dequantization based on the quantization parameter provided by the encoding device and the rearranged coefficients of the block.

The inverse-transform units 240 and 241 may perform inverse DCT and inverse DST, which correspond to DCT and DST performed by the transform units 130 and 131, on the result of quantization performed by the encoding device. The inverse-transform may be performed in transmission units determined by the encoding device. In the transform unit of the encoding device, DCT and DST may be selectively performed according to multiple pieces of information, such as the prediction method, the size of the current block, the prediction direction, and the like. The inverse-transform unit 225 may perform inverse transform based on the information about the transform performed by the transform unit of the encoding device. Transform may be performed based on a coding block rather than a transform block.

The prediction units 250 and 251 may generate a prediction block based on information about the generation of the prediction block, provided by the entropy decoding units 210 and 211, and information about previously decoded blocks or pictures, provided from the memory 270 and 271.

The prediction units 250 and 251 may include a prediction unit determination unit, an inter prediction unit, and an intra prediction unit.

The prediction unit determination unit receives various information, including prediction unit information input from the entropy decoding unit, prediction mode information about an intra prediction method, motion prediction information about an inter prediction method, and the like, separates a prediction block from a current coding block, and determines whether the prediction block performs intra prediction or inter prediction.

The inter prediction unit may perform inter prediction for the current prediction block based on information included in at least one of the picture preceding and the picture following the current picture that includes the current prediction block, using information required for inter prediction of the current prediction block provided by the encoding device. In order to perform inter prediction, it may be determined whether the method used as the motion prediction method of the prediction block included in the coding block based on the corresponding coding block is a skip mode, a merge mode, or a AMVP mode.

The intra prediction unit may generate a prediction block based on information about pixels in the current picture. When the prediction block is a prediction block on which intra prediction is performed, intra prediction may be performed based on the intra prediction mode information about the prediction block, provided by the encoding device. The intra prediction unit may include an MDIS filter for performing filtering on reference pixels of the current block, a reference pixel interpolation unit for generating reference pixels in units smaller than a single pixel by interpolating the reference pixels, and a DC filter for generating a prediction block through filtering when the prediction mode of the current block is a DC mode.

The prediction unit 250 of the decoding unit 200a of the upper layer may further include an inter-layer prediction part for performing inter-layer prediction, in which the upper layer is predicted using information about the lower layer.

The inter-layer prediction unit may perform inter-layer texture prediction, inter-layer motion prediction (inter-layer inter prediction), inter-layer syntax prediction, and the like using the texture, intra prediction mode information, motion information, syntax information, etc. about the lower layer.

According to inter-layer texture prediction, it is possible to perform prediction in which the texture of the reference block in the lower layer is used as the prediction sample of the current block of the upper layer. In this case, the texture of the reference block may be scaled by upsampling.

As the inter-layer texture prediction, there are intra BL prediction, in which the reconstructed value of the reference block in the lower layer is upsampled and the upsampled reference block is used as the prediction sample for the current block so as to encode a residual between the current block and the reference block, and reference index prediction, in which the upsampled lower layer is stored in memory and the stored lower layer is used as a reference index.

Intra prediction of the upper layer may be performed using the intra prediction mode information of the lower layer, in which case the intra prediction mode of the lower layer may be called a BL intra mode.

According to the inter-layer motion prediction, prediction for the current block of the upper layer may be performed using the motion information about the lower layer.

Also, the inter-layer prediction unit may perform inter-layer syntax prediction in which the texture of the current block is predicted or generated using the syntax information of the lower layer. In this case, the syntax information of the lower layer, used for the prediction of the current block, may include information relating an intra prediction mode, motion information, and the like.

Also, the inter-layer prediction unit may perform inter-layer residual prediction, in which the current block is predicted using the residual picture, generated based on the difference between the restored picture of the upper layer and the picture obtained by resampling the restored picture of the lower layer.

The inter-layer texture prediction, inter-layer motion prediction, inter-layer syntax prediction, and inter-layer residual prediction are described as examples of inter-layer prediction, but the inter-layer prediction that may be applied to the present invention is not limited to the above examples.

The reconstructed block or picture may be provided to the filter units 260 and 261. The filter units 260 and 261 may include a deblocking filter, an offset correction unit, and an ALF.

The encoding device may provide information about whether a deblocking filter is applied to the corresponding block or picture and information indicating that the filter is a strong filter or a weak filter when the deblocking filter is applied. The deblocking filter of the decoding device receives information about the deblocking filter provided by the encoding device, and the decoding device may perform deblocking filtering on the corresponding block.

The offset correction unit may perform offset correction on the reconstructed picture based on the type of offset correction applied to the picture during encoding and information about the offset value.

The Adaptive Loop Filter (ALF) may perform filtering based on the comparison of the picture, reconstructed after filtering, with the original picture. The ALF may be applied to a coding unit based on information about whether the ALF is applied, information about the ALF coefficient, and the like, provided by the encoding device. The information about ALF may be provided by being included in a specific parameter set.

The memory 270 and 271 may store the reconstructed picture or block to be used as a reference picture or a reference block, and may output the reconstructed picture.

The encoding device and decoding device may perform encoding on three or more layers rather than two layers, in which case the encoding unit of the upper layer and the decoding unit of the upper layer may comprise multiple encoding units and decoding units corresponding in number to the number of upper layers.

As described above, because there is a strong correlation between multiple layers in a Scalable High Efficiency Video Coding (SHVC) technique supporting a multi-layer structure, when prediction is performed using this correlation, duplicate elements may be removed and video encoding performance may be improved.

Therefore, when the encoded or decoded picture of the current layer (enhancement layer) is predicted, not only inter prediction or intra prediction using the information on the current layer but also inter-layer prediction using the information on another layer may be performed.

When inter-layer prediction is performed, the current layer may generate a prediction sample of the current layer using the decoded picture of the reference layer, which is used for inter-layer prediction, as a reference picture.

In this case, because at least one of the resolution, frame rate, color format, and viewpoint may differ between the current layer and the reference layer (due to the difference in scalability between the layers), the decoded picture of the reference layer is resampled to be adapted to the scalability of the current layer, and may then be used as the reference picture for the inter-layer prediction of the current layer. "Resampling" means up-sampling or down-sampling the samples of the reference layer picture to match the size of the current layer picture.

In the present invention, the current layer is the layer on which encoding or decoding is performed, and may be an enhancement layer or an upper layer. The reference layer is the layer that is referred to for inter-layer prediction of the current layer, and may be a base layer or a lower layer. The picture of the reference layer (that is, the reference picture) used for inter-layer prediction of the current layer may be called an inter-layer reference picture.

The SHVC standard defines a resampling filter used for resampling in a decoding process (for example, an upsampling filter), but does not define a resampling filter used for resampling in an encoding process (for example, a downsampling filter). Therefore, various (arbitrary) resampling filters may be used in the process for encoding layers, whereas the resampling filter defined in the standard is used in the process for decoding the layers. In this case, because different resampling filters may be used for the encoding and decoding processes, the phase of the sample of the picture in the reference layer (base layer) may not be identical to the phase of the sample of the picture in the current layer (enhancement layer).

In other words, the resampling filter of the decoding process (upsampling filter), defined in the SHVC standard, was designed on the assumption that no phase difference is generated between the resampling filter for the decoding process (upsampling filter) and the resampling filter for the encoding process (downsampling filter). Therefore, if a resampling filter that is not defined in the standard is used in the encoding process, the phase difference between the current layer and the reference layer is generated when resampling is performed in the decoding process.

To solve the above problem, the present invention provides a method for compensating for the phase difference between the current layer and the reference layer, which may be caused in the process of resampling the inter-layer reference picture.

Figure 3:
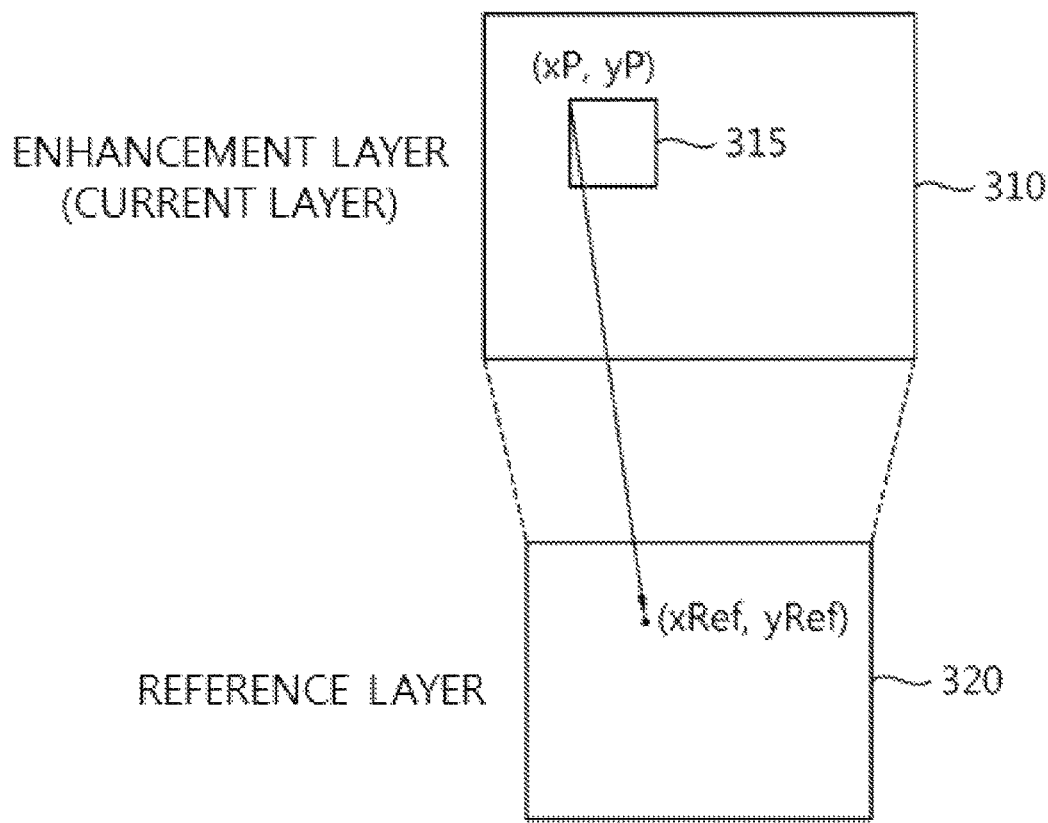
FIG. 3 is a view for explaining a method of resampling an inter-layer reference picture, which compensates for the resampling phase difference between layers, according to an embodiment of the present invention.

FIG. 3 is a view for explaining the method of resampling an inter-layer reference picture, which compensates for the resampling phase difference between layers, according to an embodiment of the present invention.

Referring to FIG. 3, when inter-layer prediction is performed on the current layer, the current block 315 of the current layer picture 310, which is the target of the prediction, may obtain the prediction sample of the current block 315 using an inter-layer reference picture 320.

In this case, the inter-layer reference picture 320 may be resampled to match the size of the current layer picture 310. Hereinafter, the process for resampling the inter-layer reference picture 320 according to an embodiment of the present invention will be described in detail.

First, the sample location (xRef, yRef) of the reference layer picture 320 corresponding to the sample location (xP, yP) of the current layer picture 310 may be derived. In this case, the sample location (xRef, yRef) of the reference layer may be derived as the location with 1/16 sample precision.

Equation 1 represents that the sample location (xRef, yRef) of the reference layer is derived as the location with 1/16 sample precision.

$$xRef=(xRef16>>4)$$

$$yRef=(yRef16>>4) \quad \text{Equation 1}$$

Here, (xRef16, yRef16) means the reference layer sample location in units of 1/16 sample corresponding to the sample location (xP, yP) of the current layer picture 310.

Also, the phase value (xPhase, yPhase) of the resampling filter used in the resampling process may be derived as Equation 2 using the reference layer sample location (xRef16, yRef) in units of 1/16 sample.

$$xPhase=(xRef16)\%16$$

$$yPhase=(yRef16)\%16 \quad \text{Equation 2}$$

According to an embodiment of the present invention, when the reference layer sample location (xRef16, yRef16) in units of 1/16 sample is derived, the phase difference between layers may be compensated for. For example, the phase difference between layers may be compensated for using information about the phase offset for compensating for the phase difference between the layers.

The reference layer sample location (xRef16, yRef16) for deriving the reference layer sample location (xRef, yRef) as the location with 1/16 sample precision may be calculated using Equation 3 and 4.

Equation 3 represents an equation for deriving the reference layer sample location (xRef16, yRef16) in units of 1/16 sample for the luma component. In this case, the reference layer sample location (xRef16, yRef16) in units of 1/16 sample for the luma component may be derived based on the information about the phase offset for compensating for the phase difference between layers for the luma component.

$$xRef16=((xP*scaleFactorX+addX)>>(shiftX-4))+ \text{luma\_phase\_offset}X$$

$$yRef16=((yP*scaleFactorY+addY)>>(shiftY-4))+\text{luma\_phase\_offset}Y \quad \text{Equation 3}$$

Equation 4 represents an equation for deriving the reference layer sample location (xRef16, yRef16) in units of 1/16 sample for the chroma component. In this case, the reference layer sample location (xRef16, yRef16) in units of 1/16 sample for the chroma component may be derived based on the information about the phase offset for compensating for the phase difference between layers for the chroma component.

$$xRef16=((xP*scaleFactorX+addX)>>(shiftX-4))+ \text{chroma\_phase\_offset}X$$

$$yRef16=((yP*scaleFactorY+addY)>>(shiftY-4))+\text{chroma\_phase\_offset}Y \quad \text{Equation 4}$$

In Equations 3 and 4, (xP, yP) indicates the location of the sample in the current layer picture 310, and means the location of the sample in the upper-left corner of the current block 315 of the current layer picture 310.

shiftX and shiftY may be as follows: shiftX=16, shiftY=16.

luma_phase_offseX, luma_phase_offseY, chroma_phase_offseX, and chroma_phase_offseY are variables for compensating for the phase difference between layers in the resampling process. For example, luma_phase_offseX and luma_phase_offseY are variables for compensating for the phase difference between layers in the case of the luma component, and chroma_phase_offseX and chroma_phase_offseY are variables for compensating for the phase difference between layers in the case of the chroma component. In this case, the variables for compensating for the phase difference between layers, that is, luma_phase_offseX, luma_phase_offseY, chroma_phase_offseX, and chroma_phase_offseY, may be determined on a picture basis or on a slice basis, and may be signaled through a picture parameter set, a slice header, and the like, according to the determined unit.

In Equations 3 and 4, scaleFactorX and scaleFactorY may be defined as Equation 5.

$$\text{scaleFactor}X=((PicWRL<<\text{shift}X)+(\text{scaled}W>>1))/\text{Scaled}W$$

$$\text{scaleFactor}Y=((PicHRL<<\text{shift}Y)+(\text{scaled}H>>1))/\text{Scaled}H \quad \text{Equation 5}$$

In Equations 3 and 4, addX and addY may be defined as Equation 6.

$$\text{add}X=(((PicWRL*\text{phase}X)<<(\text{shift}X-2))+ (\text{Scaled}W>>1))/\text{Scaled}W+(1<<(\text{shift}X-5))$$

$$\text{add}Y=(((PicHRL*\text{phase}Y)<<(\text{shift}Y-2))+ (\text{Scaled}H>>1))/\text{Scaled}H+(1<<(\text{shift}Y-5)) \quad \text{Equation 6}$$

In Equations 5 and 6, scaledW may be defined as 1.5*PicWRL or 2.0*PicWRL, and scaledH may be defined as 1.5*PicHRL or 2.0*PicHRL. PicWRL may be defined as the width of the reference layer, and PicHRL may be defined as the height of the reference layer.

As described above, when the reference layer sample location is derived, the phase offset information such as addX, addY, phaseX, phaseY, luma_phase_offsetX, luma_phase_offsetY, chroma_phase_offsetX, chroma_phase_offsetY, etc. may be used to compensate for the phase difference between layers, as represented in Equations 3 to 6.

Here, when the reference layer sample location in units of 1/16sample for the chroma component is derived, information relating to the phase offset for the chroma component or information relating to the phase offset for the luma component may be used. For example, information relating to the phase offset for the chroma component, that is, addX, addY, phaseX, phaseY, chroma_phase_offsetX, and chroma_ phase_offsetY, for the chroma component may be derived as ½of addX, addY, phaseX, phaseY, luma_phase_offsetX, and luma_phase_offsetY for the luma component, respectively.

Next, interpolation may be performed on the sample location (xP, yP) of the current layer picture 310 based on the reference layer sample location (xRef, yRef) and the phase value (xPhase, yPhase), which are derived using the location (xRef16, yRef16) with 1/16sample precision, as described above.

In this case, an 8-tap filter and a 4-tap filter may respectively be used for the luma component and the chroma component in the interpolation process. Also, different filter coefficients may be used for each phase.

Table 1 represents an example of the 8-tap filter (filter coefficients) for the luma component according to 1/16phase as used in the resampling process, and Table 2 represents an example of the 4-tap filter (filter coefficients) for the chroma component according to 1/16phase used in the resampling process.

TABLE 1

| phase p | $f_L[p,0]$ | $f_L[p,1]$ | $f_L[p,2]$ | $f_L[p,3]$ | $f_L[p,4]$ | $f_L[p,5]$ | $f_L[p,6]$ | $f_L[p,7]$ |
|---|---|---|---|---|---|---|---|---|
| 0 | 0 | 0 | 0 | 0 | 64 | 0 | 0 | 0 |
| 1 | 0 | 1 | −3 | 63 | 4 | −2 | 1 | 0 |
| 2 | −1 | 2 | −5 | 62 | 8 | −3 | 1 | 0 |
| 3 | −1 | 3 | −8 | 60 | 13 | −4 | 1 | 0 |
| 4 | −1 | 4 | −10 | 58 | 17 | −5 | 1 | 0 |
| 5 | −1 | 4 | −11 | 52 | 26 | −8 | 3 | −1 |
| 6 | −1 | 3 | −9 | 47 | 31 | −10 | 4 | −1 |
| 7 | −1 | 4 | −11 | 45 | 34 | −10 | 4 | −1 |
| 8 | −1 | 4 | −11 | 40 | 40 | −11 | 4 | −1 |
| 9 | −1 | 4 | −10 | 34 | 45 | −11 | 4 | −1 |
| 10 | −1 | 4 | −10 | 31 | 47 | −9 | 3 | −1 |
| 11 | −1 | 3 | −8 | 26 | 52 | −11 | 4 | −1 |
| 12 | 0 | 1 | −5 | 17 | 58 | −10 | 4 | −1 |
| 13 | 0 | 1 | −4 | 13 | 60 | −8 | 3 | −1 |
| 14 | 0 | 1 | −3 | 8 | 62 | −5 | 2 | −1 |
| 15 | 0 | 1 | −2 | 4 | 63 | −3 | 1 | 0 |

TABLE 2

| phase p | $f_c[p,0]$ | $f_c[p,1]$ | $f_c[p,2]$ | $f_c[p,3]$ |
|---|---|---|---|---|
| 0 | 0 | 64 | 0 | 0 |
| 1 | −2 | 62 | 4 | 0 |
| 2 | −2 | 58 | 10 | −2 |
| 3 | −4 | 56 | 14 | −2 |
| 4 | −4 | 54 | 16 | −2 |
| 5 | −6 | 52 | 20 | −2 |
| 6 | −6 | 46 | 28 | −4 |
| 7 | −4 | 42 | 30 | −4 |
| 8 | −4 | 36 | 36 | −4 |
| 9 | −4 | 30 | 42 | −4 |
| 10 | −4 | 28 | 46 | −6 |
| 11 | −2 | 20 | 52 | −6 |
| 12 | −2 | 16 | 54 | −4 |
| 13 | −2 | 14 | 56 | −4 |

TABLE 2-continued

| phase p | $f_c[p,0]$ | $f_c[p,1]$ | $f_c[p,2]$ | $f_c[p,3]$ |
|---|---|---|---|---|
| 14 | −2 | 10 | 58 | −2 |
| 15 | 0 | 4 | 62 | −2 |

As described above, based on the reference layer sample location (xRef, yRef) and the phase value (xPhase, yPhase), the interpolation is performed on the sample location (xP, yP) of the current layer using the filter coefficients given in Table 1 and 2, whereby the resampled sample values (resampled inter-layer reference picture) may be obtained. Inter-layer prediction (motion compensation) for the current block 315 of the current layer picture 310 may be performed using this resampled inter-layer reference picture, and as a result, the prediction samples of the current block 315 may be obtained.

As described above, in order to compensate for the phase difference between layers in the process for resampling the inter-layer reference picture, an embodiment of the present invention signals the phase offset information for compensating for the phase difference between layers, which is determined by a picture unit or on a slice unit, and derives the reference layer sample location based on the signaled phase offset information.

In this case, the phase offset information for the luma component and the phase offset information for the chroma component may be signaled individually, or the phase offset information for the chroma component may be derived based on the phase offset information for the luma component.

Hereinafter, a method for deriving the phase offset for compensating for the phase difference between layers for the chroma component, according to an embodiment of the present invention, will be described.

As the method for deriving the phase offset information for the chroma component, according to an embodiment of the present invention, there are 1) a method in which the phase offset information for the luma component is used as the phase offset information for the chroma component, 2) a method in which the phase offset information for the chroma component is derived based on the phase offset information for the luma component, and 3) a method in which the phase offset information for the chroma component is derived by signaling whether there is any difference between the phase offset information for the luma component and the phase offset information for the chroma component.

1) A method in which the phase offset information for the luma component is used as the phase offset information for the chroma component The phase offset information for the chroma component may be set to the same value as the phase offset information for the luma component. For example, when the reference layer sample location (xRef16, yRef16) in units of 1/16sample corresponding to the current sample location (xP, yP) of the current layer picture is derived, both the reference sample location for the luma component and the reference sample location for the chroma component may be calculated using Equation 3.

2) A method in which the phase offset information for the chroma component is derived based on the phase offset information for the luma component The phase offset information for the chroma component may be derived from the phase offset information for the luma component using a predetermined operation. For example, the phase offset information for the chroma component may be derived using an operation, that is, by multiplying or dividing the phase offset information for the luma component by a specific value (for example, ½, ¼, etc.)

3) A method in which the phase offset information for the chroma component is derived by signaling whether there is any difference between the phase offset information for the luma component and the phase offset information for the chroma component.

Whether the phase offset information for the chroma component is the same as the phase offset information for the luma component may be signaled through a picture parameter set, a slice header, and the like.

If the phase offset information for the chroma component is the same as the phase offset information for the luma component, the phase offset information for the luma component may be used as the phase offset information for the chroma component.

If the phase offset information for the chroma component is different from the phase offset information for the luma component, the phase offset information for the chroma component may be signaled, or the difference between the phase offset information for the luma component and the phase offset information for the chroma component may be signaled.

Table 3 represents an example of syntax in which the phase offset information for compensating for the phase difference between layers is determined by a picture unit, and the phase offset information is signaled through a picture parameter set.

TABLE 3

| pic_parameter_set_rbsp( ) { | Descriptor |
| --- | --- |
| pps_pic_parameter_set_id | ue(v) |
| pps_seq_parameter_set_id | ue(v) |
| if( nuh_layer_id > 0 && | |
| InterLayerTextureRlEnableFlag ) { | |
| luma_phase_offset[0] | se(v) |
| luma_phase_offset[1] | se(v) |
| isSameLumaPhaseX | u(l) |
| isSameLumaPhaseY | u(l) |
| if(isSameLumaPhaseX == 0) | |
| chroma_phase_offsetX | se(v) |
| if(isSameLumaPhaseY == 0) | |
| chroma_phase_offsetY | se(v) |
| } | |
| ... | |
| } | |

Referring to Table 3, luma_phase_offsetX denotes the value of the x-axis component of the phase for the luma component. luma_phase_offsetY denotes the value of the y-axis component of the phase for the luma component.

isSameLumaPhaseX indicates whether the value of the x-axis component of the phase for the chroma component is the same as that for the luma component. If isSameLumaPhaseX is 1, this indicates that the value of the x-axis component of the phase for the chroma component is the same as that for the luma component, whereas if isSameLumaPhaseX is 0, this indicates that the value of the x-axis component of the phase for the chroma component is different from that for the luma component.

isSameLumaPhaseY indicates whether the value of the y-axis component of the phase for the chroma component is the same as that for the luma component. If isSameLumaPhaseY is 1, this indicates that the value of the y-axis component of the phase for the chroma component is the same as that for the luma component, whereas if isSameLumaPhaseY is 0, this indicates that the value of the y-axis component of the phase for the chroma component is different from that for the luma component.

chroma_phase_offsetX denotes the value of the x-axis component of the phase for the chroma component. chroma_phase_offsetY denotes the value of the y-axis component of the phase for the chroma component.

Table 4 represents another example of syntax in which the phase offset information for compensating for the phase difference between layers is determined by a picture unit, and the phase offset information is signaled through a picture parameter set.

TABLE 4

| pic_parameter_set_rbsp( ) { | Descriptor |
| --- | --- |
| pps_pic_parameter_set_id | ue(v) |
| pps_seq_parameter_set_id | ue(v) |
| if( nuh_layer_id > 0 && | |
| InterLayerTextureRlEnableFlag ) { | |
| luma_phase_offsetX | se(v) |
| lume_phase_offsetY | se(v) |
| isSameLumaPhaseX | u(l) |
| isSameLumaPhaseY | u(l) |
| if(isSameLumaPhaseX == 0) | |
| delta_phase_offsetX | se(v) |
| if(isSameLumaPhaseY == 0) | |
| delta_phase_offsetY | se(v) |
| } | |
| ... | |
| } | |

Referring to Table 4, luma_phase_offsetX denotes the value of the x-axis component of the phase for the luma component. luma_phase_offsetY denotes the value of the y-axis component of the phase for the luma component.

isSameLumaPhaseX indicates whether the value of the x-axis component of the phase for the chroma component is the same as that for the luma component. If isSameLumaPhaseX is 1, this indicates that the value of the x-axis component of the phase for the chroma component is the same as that for the luma component, whereas if isSameLumaPhaseX is 0, this indicates that the value of the x-axis component of the phase for the chroma component is different from that for the luma component.

isSameLumaPhaseY indicates whether the value of the y-axis component of the phase for the chroma component is the same as that for the luma component. If isSameLumaPhaseY is 1, this indicates that the value of the y-axis component of the phase for the chroma component is the same as that for the luma component, whereas if isSameLumaPhaseY is 0, this indicates that the value of the y-axis component of the phase for the chroma component is different from that for the luma component.

delta_phase_offsetX equals luma_phase_offsetX−chroma_phase_offsetX. delta_phase_offsetY equals luma_phase_offsetX−chroma_phase_offsetX.

Figure 4:
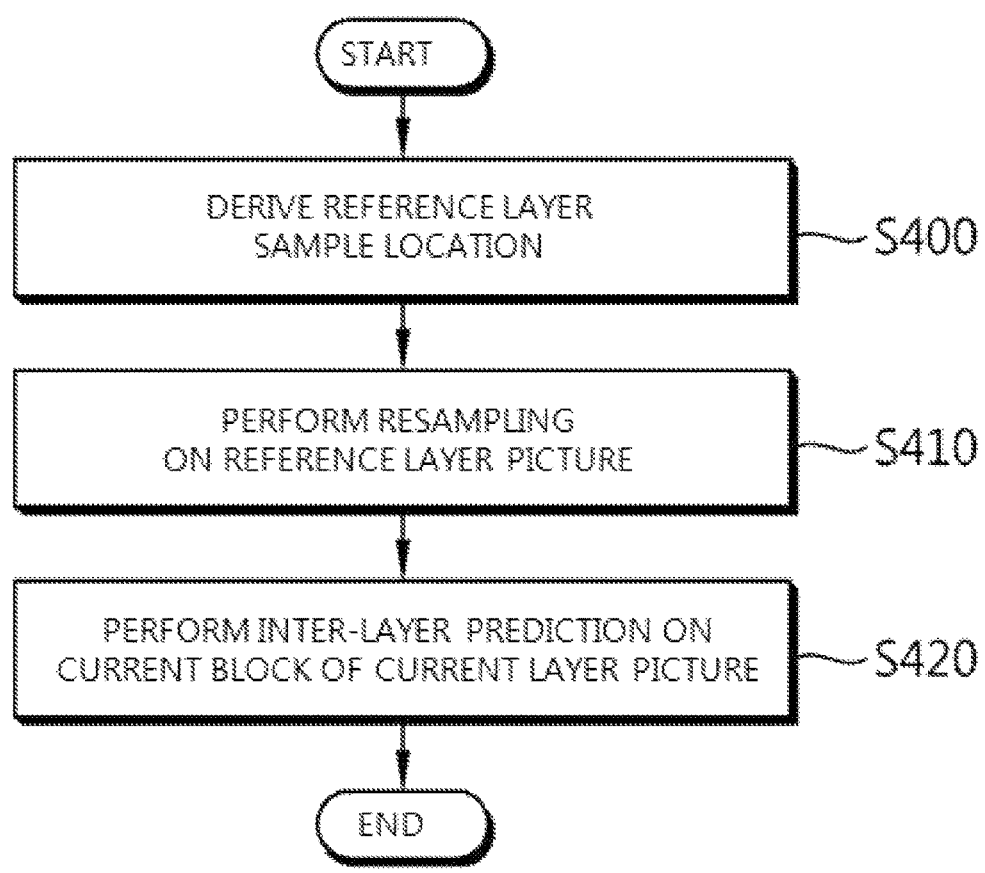
FIG. 4 is a flowchart schematically describing a method for performing inter-layer prediction using a resampling method for compensating for a resampling phase difference between layers in a scalable coding structure, according to an embodiment of the present invention.

FIG. 4 is a flowchart schematically describing a method for performing inter-layer prediction using a resampling method for compensating for the resampling phase difference between layers in a scalable video coding structure according to an embodiment of the present invention.

The method of FIG. 4 may be performed by the encoding device of FIG. 1 and the decoding device of FIG. 2, and more specifically, may be performed by the prediction unit of the encoding device of FIG. 1 and the prediction unit of the decoding device of FIG. 2. Also, in FIG. 4, an example in which the inter-layer prediction method according to an embodiment of the present invention is performed by the decoding device is shown for convenience of description.

A scalable video coding structure may include multiple layers. For example, the current layer, on which decoding is performed, and a reference layer, used for the inter-layer prediction of the current layer, may be included. The current layer may be an enhancement layer, and the reference layer may be a base layer or a lower layer that provides lower scalability than the current layer.

Referring to FIG. 4, the decoding device derives the reference layer sample location from the reference layer picture, which is used for inter-layer prediction of the current layer picture (S400).

The reference layer sample location is the sample location in the reference layer picture corresponding to the top-left sample location of the current block in the current layer picture, and may be the sample location used when resampling the reference layer.

As described above, because a phase difference between layers may be generated in the resampling process, it is necessary to compensate for the phase difference between layers in the resampling process.

Accordingly, the reference layer sample location may be derived based on phase offset information for compensating for the phase difference between layers. The phase offset information may include at least one of phase offset information for the luma component and phase offset information for the chroma component.

For example, the decoding device may derive the reference layer sample location in units of $1/16$ sample, and may match the phases between layers by compensating for the phase difference for the reference layer sample location in units of $1/16$ sample. As described above, using Equations 3 to 6, the decoding device may derive the reference layer sample location in units of $1/16$ sample, in which the phase difference is compensated for.

In this case, the decoding device may derive the reference layer sample location based on the phase offset information for the luma component or the phase offset information for the chroma component, according to the color component of the reference layer picture. For example, if the color component of the reference layer picture is the luma component, the decoding device may derive the reference layer sample location in units of $1/16$ sample for the luma component based on the phase offset information for the luma component, and it may be obtained as shown in Equation 3. If the color component of the reference layer picture is the chroma component, the decoding device may derive the reference layer sample location in units of $1/16$ sample for the chroma component based on the phase offset information for the chroma component, and it may be obtained as shown in Equation 4.

The phase offset information for compensating for the phase difference between layers may be signaled from the encoding device. The encoding device determines the phase offset by a picture unit, a slice unit, or the like, and may signal the phase offset information to the decoding device through a picture parameter set, a slice header, etc, according to the determined unit. When signaling the phase offset information, the encoding device may signal the phase offset information for the luma component and the phase offset information for the chroma component separately, or may signal information for deriving the phase offset information for the chroma component based on the phase offset information for the luma component.

As described above, the decoding device may obtain the phase offset information for the luma component and the phase offset information for the chroma component based on the phase offset information signaled by the encoding device.

For example, the decoding device may use the phase offset for the luma component as the phase offset for the chroma component.

Alternatively, the decoding device may derive the phase offset for the chroma component based on the phase offset for the luma component. For example, it may be derived from the phase offset for the luma component using a predetermined condition. The predetermined condition may be an operation in which the phase offset for the luma component is multiplied or divided by a specific value (for example, ½, ¼, etc.)

Alternatively, the decoding device may obtain the phase offset information for the luma component and chroma component based on a flag indicating whether the phase offset for the luma component is the same as the phase offset for the chroma component. For example, if the flag indicates that the phase offset for the chroma component is the same as that for luma component (for example, if the flag is 1), the decoding device may use the phase offset for the luma component as the phase offset for the chroma component. If the flag indicates that the phase offset for the chroma component is not the same as that for luma component (for example, if the flag is 0), the decoding device obtains the phase offset for the chroma component from the picture parameter set, the slice header, and the like, or may obtain the phase offset for the chroma component based on the difference between the phase offset for the chroma component and the phase offset for the luma component. For example, the encoding device may signal the syntax illustrated in Table 3 or 4, and the decoding device may obtain the phase offset information for the luma component and the chroma component through the syntax.

The decoding device performs resampling on the reference layer picture based on the reference layer sample location (S410).

More specifically, the decoding device may derive the phase value of the resampling filter used in the resampling process. The phase value may be derived using the reference layer sample location in units of $1/16$ sample. For example, the phase value may be calculated using Equation 2.

Next, the decoding device may perform interpolation on the top-left sample location of the current block of the current layer picture based on the derived reference layer sample location and the phase.

In the case of the luma component, the decoding device may perform interpolation on the luma component sample using the 8-tap interpolation filter as shown in Table 1. In the case of the chroma component, the decoding device may perform interpolation on the chroma component sample using the 4-tap interpolation filter, as shown in Table 2.

In other words, the decoding device may obtain the interpolated sample values by performing interpolation on the top-left sample of the current block using different interpolation filter coefficients depending on the reference layer sample location and the phase.

Next, the decoding device may obtain the resampled sample values for the reference layer picture (resampled inter-layer reference picture) from the interpolated sample values.

The decoding device may perform inter-layer prediction for the current block of the current layer picture based on the resampled sample values (resampled inter-layer reference picture), whereby the prediction sample of the current block may be generated (S420).

The decoding device may reconstruct the current block based on the prediction samples of the current block, generated through the above-described inter-layer prediction, and the residual samples of the current block.

Meanwhile, in the encoding process, the residual samples of the current block may be derived based on the prediction samples of the current block, generated through the above-described steps S400 to S420, and after transform and quantization are performed on the residual samples of the current block, the result may be entropy-coded.

When inter-layer prediction is performed using the resampling method according to an embodiment of the present invention, as described above, the phase difference, which may be generated in the resampling process, may be compensated for by inducing the phase shift, thus reducing any error attributable to the phase difference generated in the resampling process. Also, according to an embodiment of the present invention, because the error attributable to the phase difference generated in the resampling process is reduced, prediction accuracy may be improved, and encoding and decoding efficiency may also be improved.

The above-described method according to the present invention may be implemented as a program that can be executed by various computer means, and may be recorded on a computer-readable storage medium. Examples of the computer-readable storage medium include ROM, RAM, CD-ROM, a magnetic tape, a floppy disk, optical data storage, and the like, and may be implemented in the form of carrier waves (for example, transmission over the Internet).

The computer-readable storage medium may be distributed in a computer system connected by a network, and codes that computers can read may be stored and executed using a distributed method. Also, functional programs, codes, and code segments for implementing the above method may be easily understood by programmers of the technical fields including the present invention.

While the methods have been described as steps or blocks on the basis of flowcharts in the above embodiments, the present invention is not limited to the order of steps and some steps can be generated in a different sequence or simultaneously. It will be understood by those skilled in the art that steps of a flowchart are not exclusive and can include other steps, or one or more steps of the flowchart can be deleted without affecting the scope of the present invention.

The above description is merely an illustration of the technical spirit of the present invention, and those having ordinary knowledge in the technical field to which the present invention pertains can make modifications and variations within the range that does not depart from the essential characteristics of the present invention. Accordingly, the disclosed embodiments of the present invention are not intended to limit the technical spirit of the present invention but to illustrate the technical spirit of the present invention, and the scope of the technical spirit of the present invention is not limited to these embodiments. The range of protection of the present invention should be interpreted based on the following claims, and all technical spirit within the range equivalent to the claims should be construed as falling within the range of the rights of the present invention.

The invention claimed is:

1. A video decoding method supporting multiple layers, the video decoding method comprising:

deriving a reference layer sample location from a reference layer picture used for inter-layer prediction of a current layer picture;

resampling the reference layer picture based on the reference layer sample location; and generating a prediction sample of a current block of the current layer picture by performing inter-layer prediction on the current block of the current layer picture based on the resampled reference layer picture, wherein deriving the reference layer sample location is configured to derive the reference layer sample location corresponding to a top-left sample location of the current block based on information relating to a phase offset indicating one of horizontal and vertical values of phase shift, the information relating to the phase offset including at least one of a phase offset for a luma component and a phase offset for a chroma component wherein the inter-layer prediction includes inter-layer texture prediction and inter-layer motion prediction, wherein the information relating to the phase offset is used to derive the reference layer sample location when the inter-layer prediction performs the inter-layer texture prediction, and wherein interpolation on the top-left sample location of the current block is performed for resampling the reference layer picture based on the derived reference layer sample location and a phase value, wherein the phase value is a different value from the information relating to the phase offset, and wherein the information relating to the phase offset is obtained from a picture parameter set or a slice header of an encoded bitstream, but the phase value is derived based on the derived reference layer sample location.

2. The video decoding method of claim 1, wherein deriving the reference layer sample location is configured to derive the reference layer sample location in units of $1/16$ sample, and when the reference layer sample location in units of $1/16$ sample is derived, a phase difference between layers is compensated for using the information relating to the phase offset.

3. The video decoding method of claim 1, wherein the phase offset for the chroma component is derived based on the phase offset for the luma component.

4. The video decoding method of claim 3, wherein the phase offset for the chroma component is derived as a value identical to the phase offset for the luma component.

5. The video decoding method of claim 3, wherein the phase offset for the chroma component is derived as $1/2$ of the phase offset for the luma component.

6. The video decoding method of claim 1, further comprising, obtaining information indicating whether the phase offset for the luma component is identical to the phase offset for the chroma component, wherein when it is indicated that the phase offset for the luma component is identical to the phase offset for the chroma component, the phase offset for the chroma component uses the phase offset for the luma component, and when it is indicated that the phase offset for the luma component is not identical to the phase offset for the chroma component, the phase offset for the chroma component is obtained from a picture parameter set or a slice header, or is obtained based on a difference between the phase offset for the luma component and the phase offset for the chroma component.

7. The video decoding method of claim 1, wherein resampling the reference layer picture is configured to perform interpolation on the top-left luma sample location of the current block using an 8-tap interpolation filter, based on the reference layer sample location and the phase value.

8. The video decoding method of claim 1, wherein resampling the reference layer picture is configured to perform interpolation on the top-left chroma sample location of the current block using a 4-tap interpolation filter, based on the reference layer sample location and the phase value.

9. A video decoding device supporting multiple layers, the video decoding device comprising:
 an inter-layer predictor configured to derive a reference layer sample location from a reference layer picture used for inter-layer prediction of a current layer picture, resample the reference layer picture based on the reference layer sample location, and generate a prediction sample of a current block of the current layer picture by performing inter-layer prediction on the current block of the current layer picture based on the resampled reference layer picture,
 wherein the prediction unit derives the reference layer sample location corresponding to a top-left sample location of the current block based on information relating to a phase offset indicating one of horizontal and vertical values of phase shift, the information relating to the phase offset including at least one of a phase offset for a luma component and a phase offset for a chroma component,
 wherein the inter-layer prediction includes inter-layer texture prediction and inter-layer motion prediction,
 wherein the information relating to the phase offset is used to derive the reference layer sample location when the inter-layer prediction performs the inter-layer texture prediction,
 wherein the inter-layer predictor is configured to perform interpolation on the top-left sample location of the current block for resampling the reference layer picture based on the derived reference layer sample location and a phase value,
 wherein the phase value is a different value from the information relating to the phase offset, and
 wherein the information relating to the phase offset is obtained from a picture parameter set or a slice header of an encoded bitstream, but the phase value is derived based on the derived reference layer sample location.

10. The video decoding device of claim 9, wherein the inter-layer predictor derives the reference layer sample location in units of $1/16$ sample, and when the reference layer sample location in units of $1/16$ sample is derived, a phase difference between layers is compensated for using the information relating to the phase offset.

11. The video decoding device of claim 9, wherein the inter-layer predictor derives the phase offset for the chroma component based on the phase offset for the luma component.

12. The video decoding device of claim 11, wherein the inter-layer predictor derives the phase offset for the chroma component as a value identical to the phase offset for the luma component.

13. The video decoding device of claim 11, wherein the inter-layer predictor derives the phase offset for the chroma component as $1/2$ of the phase offset for the luma component.

14. The video decoding device of claim 9, wherein the inter-layer predictor is configured to:
 obtain information indicating whether the phase offset for the luma component is identical to the phase offset for the chroma component,
 derive the phase offset for the luma component as the phase offset for the chroma component when it is indicated that the phase offset for the luma component is identical to the phase offset for the chroma component, and
 obtain the phase offset for the chroma component from a picture parameter set or a slice header, or obtains the phase offset for the chroma component based on a difference between the phase offset for the luma component and the phase offset for the chroma component when it is indicated that the phase offset for the luma component is not identical to the phase offset for the chroma component.

15. The video decoding device of claim 9, wherein the inter-layer predictor performs interpolation on the top-left luma sample location of the current block using an 8-tap interpolation filter based on the reference layer sample location and the phase value.

16. The video decoding device of claim 9, wherein the inter-layer predictor performs interpolation on the top-left chroma sample location of the current block using a 4-tap interpolation filter, based on the reference layer sample location and the phase value.

* * * * *